UNITED STATES PATENT OFFICE.

LUTHER ATWOOD, OF BOSTON, MASSACHUSETTS.

IMPROVEMENT IN PREPARING LUBRICATING-OILS.

Specification forming part of Letters Patent No. 9,630, dated March 29, 1853.

*To all whom it may concern:*

Be it known that I, LUTHER ATWOOD, of Boston, in the county of Suffolk and State of Massachusetts, have invented or discovered a new and useful chemical material, composition, or manufacture, which I denominate "Coup-Oil," to be used particularly for lubricating purposes; and I do hereby declare that the same and the mode of producing it are fully described in the following specification.

The invention hereinafter described is founded on a discovery which I have made—viz., that the substance called "paranaphthaline" alone and especially when mixed with oils is a very excellent lubricator for metal surfaces. By means of a process hereinafter explained a combination or composition of this substance with fixed oil may be separated in large quantities from coal-tar, and purified so as to fit it for use for the purpose stated.

It is well known that in coal-tar there are many different hydrocarbons, whose boiling-points are at various temperatures below 480° Fahrenheit. These substances I reject in my process and carry on the distillation at a higher temperature under certain modifications, so as to produce a mixture of oil with paranaphthaline having the fixity of such oil as sperm-oil. I particularly intend to use this new manufacture or mixture obtained from coal-tar for lubricating purposes, either as a simple compound of paranaphthaline and fixed oil, or when added to other oils, so as to render them good lubricators.

The process which in practice is found to be efficient in producing my said new manufacture or composition, to which I give the name of "Coup-Oil," is as follows: Into a horizontal cylindrical retort connected with a suitable condenser or worm I introduce a quantity of crude coal-tar. Heat being applied, vapors of fluids are condensed in the condenser until the temperature of the vapor in the retort rises to about 700° Fahrenheit, before which time the condenser must be allowed to attain the temperature of 150° to 175° Fahrenheit. Having separated the aqueous and ammoniacal fluids, the whole distillate is removed to an iron cylindrical vessel, which can be heated by steam and is provided with a stirring apparatus. For every one hundred wine gallons of distillate to be treated, I use about two hundred pounds, avoirdupois, of solution of caustic soda, marking about 25° Baumé, and I agitate powerfully for about two hours this mixture of fluids, raising the temperature to about 120° Fahrenheit. After repose for subsidence the clear distillate is removed to a leaden vessel provided with an agitator. When the fluid has been rapidly stirred I add about fifty pounds of sulphuric acid for every parcel of one hundred gallons, and continue to stir the whole about four hours. Allowing the acid to subside, the clear oil is removed to an iron vessel like that before used, and agitated with about one hundred pounds of solution of caustic soda, making about 25° Baumé, for two hours. After this has reposed for about six hours the clear oils on the surface are prepared for distillation. A hemispherical cast-iron retort is used for distilling the purified mixture of oils, and the condenser, which is connected with it is so arranged that its temperature will not fall below 150° Fahrenheit. At the end of the condenser is a loosely-covered receiver, into which all the products fall until the vapor in the retort reaches the temperature of 450° Fahrenheit. When the vapor attains the heat of 450° Fahrenheit the condenser is opened to another reservoir, and the oily products rising in consequence of increased heat applied to the still are received apart from the first products condensed. The distillation is to be continued until by observation the temperature of the vapor marks about 670° Fahrenheit, when the operation may cease and the thick residue in the still be discharged from the bottom into suitable vessels. The slightly impure oil thus obtained must be mixed in a leaden vessel with sulphuric acid in the proportion of about twenty-five pounds of acid to one hundred gallons of the oil and agitated for about three hours. The acid being allowed to subside, the clear oil receives its final purification by agitation with a solution of caustic soda, about 25° Baumé, in the proportion of about one hundred pounds of the solution to one hundred gallons of the oil. When removed from this alkaline solution the oil must be distilled from a retort of iron containing about twelve pounds of hydrate of potash or soda, previously mixed with about one gallon of water, for every one hundred gallons of oil, receiving apart the oil condensing at 450° to 480°, and stopping the operation when the vapors rise in temperature to 650° Fahrenheit. The oil condensed from this operation is the new compound or manufacture, which, under the name of "Coup-Oil," I intend to use as a lubricator of great value when applied to machinery and especially to light machinery in rapid motion.

I have found that this composition, when mixed with common oils, confers its high powers as a lubricator on them, rendering such oils as are naturally unfit for this purpose very useful for lubricating large bearings when from the great friction much body is required. When mixed with oils and even fats the coup-oil renders them more mobile and prevents solidification at ordinary temperatures, in some cases enabling the mixture to bear a greater reduction of temperature than naturally occurs.

If paranaphthaline be mixed with thin oils, it serves to give body to them and to either give them lubricating properties or to improve them as lubricators.

In the above process I produce what has usually been termed the "dead-oil" of commerce, the component parts of which are naphtha, naphthaline, fixed oil boiling at 440° to 500° Fahrenheit. Having produced said dead-oil, I carry the process of distillation to, or about to, the extent above set forth, and produce the new manufacture which I have termed "Coup-Oil," the constituent parts of which are fixed oils boiling from 450° to 675° Fahrenheit, and pure paranaphthaline only. Thus it will be seen that I remove from the dead-oil, by means of my alkaline and acid applications, conjoined with distillations in the order named, naphtha, naphthaline, and crude tarry products, all of which render the common dead-oil inapplicable for lubricating nice machinery or that used at high speed. Coup-oil can be mixed with other oils, conferring on them lubricating properties, whereas dead-oil cannot be so applied. Chemically speaking, the proximate elements present in common dead-oil are modified by the operation of heat and solvents, so as to produce a new body consisting of fixed oil and pure paranaphthaline. A combination of fixed oil and paranaphthaline without the addition of any other chemical compound, known as "naphtha," "naphthaline," &c., as set forth, is therefore a new composition of matter not known or used in the arts before my discovery or invention.

My improved manufacture of coup-oil differs essentially from paraffine oil, for, as the former is a composition of fixed oils and paranaphthaline, and as paranaphthaline is a composition of thirty parts carbon to twelve of hydrogen, and as paraffine is a compound consisting of forty-eight parts carbon to fifty of hydrogen, we find the carbon and hydrogen in very different proportions in the coup-oil to what they are in the paraffine-oil. While paraffine-oil can be burned in a lamp with a fine white flame, the coup-oil, on account of the dense volume of smoke produced, cannot be burned in those lamps specially adapted to burning hydrocarbons. Paraffine-oil and paraffine are produced in the distillation of bituminous coals by a slow fire. Coup-oil is first produced by the decomposition of coal in making gas, and is eliminated from the tar compounds by the process above described. The coup-oil cannot be produced by the distillation of coals; but in order to produce it the coals must be decomposed by sudden violent heat and converted into gas and tar. No process to which coup-oil can be subjected will produce paraffine from it, while paraffine-oil allows paraffine to separate from it on cooling, and yields it by compression. By way of illustration, the oils differ as a solution of beeswax in oil differs from a solution of spermaceti in spermaceti-oil.

An advantage which my coup-oil possesses over paraffine-oil arises from the fact that when it is mixed with many other oils or fatty matters it not only forms with them a new composition, but imparts to them useful properties such as they do not receive on being mixed with paraffine-oil.

It will readily be seen that paraffine-oil, partaking of the nature of wax, does not in its mixture with concrete oils or fats confer mobility; nor does it, like coup-oil, which resembles spermaceti-oil, increase the antifriction properties of such oils or fats, or improve them in any like degree for lubricating purposes.

What, therefore, I claim as my invention is—

1. The coup-oil, or new manufacture, (or combination of paranaphthaline and fixed oils derived from coal-tar and boiling from 450° to 675° Fahrenheit,) as produced by the process substantially as hereinbefore described, the said new manufacture being highly useful as a lubricating composition, either alone or combined with oils or fatty matters, as above set forth.

2. The combination of this product so made with concrete or thick fatty matters or oils for the purpose of liquefying them or rendering them more mobile or imparting to them lubricating qualities, as hereinbefore specified.

In testimony whereof I have hereto set my signature this 31st day of January, A. D. 1853.

LUTHER ATWOOD.

Witnesses:
F. P. HALE, Jr.,
R. H. EDDY.